(12) United States Patent
Truschel

(10) Patent No.: US 12,447,296 B1
(45) Date of Patent: Oct. 21, 2025

(54) SYSTEMS AND METHODS OF DETERMINING THERAPEUTIC EXPIRATORY PRESSURE AUTOMATICALLY

(71) Applicant: BREAS MEDICAL AB, MOLNLYCKE (SE)

(72) Inventor: William A. Truschel, Oakmont, PA (US)

(73) Assignee: BREAS MEDICAL AB, Molnlycke (SE)

( * ) Notice: Subject to any disclaimer, the term of this patent is extended or adjusted under 35 U.S.C. 154(b) by 904 days.

(21) Appl. No.: 17/682,068

(22) Filed: Feb. 28, 2022

(51) Int. Cl.
*A61M 16/00* (2006.01)

(52) U.S. Cl.
CPC ...... *A61M 16/024* (2017.08); *A61M 16/0003* (2014.02); *A61M 2016/0027* (2013.01); *A61M 2016/0042* (2013.01); *A61M 16/026* (2017.08); *A61M 2230/42* (2013.01)

(58) Field of Classification Search
CPC .............. A61M 16/024; A61M 16/026; A61M 2205/502; A61M 2205/505; A61M 2205/3331; A61M 2205/3334
See application file for complete search history.

(56) References Cited

U.S. PATENT DOCUMENTS

| | | | |
|---|---|---|---|
| 5,303,698 A * | 4/1994 | Tobia | A61M 16/205 128/205.24 |
| 9,775,558 B2 | 10/2017 | Truschel | |
| 10,165,966 B2 * | 1/2019 | Banner | A61M 16/0833 |
| 11,738,161 B2 * | 8/2023 | Albanese | A61M 15/002 128/200.24 |
| 2003/0196663 A1 * | 10/2003 | Wenkebach | A61M 16/024 128/204.22 |
| 2006/0163727 A1 | 7/2006 | Biondi | |
| 2008/0295839 A1 | 12/2008 | Habashi | |
| 2009/0266360 A1 | 10/2009 | Acker | |
| 2009/0272382 A1 * | 11/2009 | Euliano | A61B 5/08 703/2 |
| 2009/0292180 A1 | 11/2009 | Mirow | |
| 2010/0083968 A1 | 4/2010 | Wondka | |
| 2012/0137250 A1 * | 5/2012 | Milne | A61M 16/026 715/808 |
| 2012/0298108 A1 * | 11/2012 | Kane | A61M 16/0066 128/204.23 |

(Continued)

FOREIGN PATENT DOCUMENTS

| | | | | |
|---|---|---|---|---|
| DE | 19528113 A1 * | 2/1997 | ........ | A61M 16/0051 |
| WO | WO-2011090716 A2 * | 7/2011 | ............ | A61B 5/087 |
| WO | WO-2023057976 A1 * | 4/2023 | .......... | A61M 16/024 |

OTHER PUBLICATIONS

DE 19528113 Machine translation (Year: 1997).*

(Continued)

*Primary Examiner* — Victoria Murphy
*Assistant Examiner* — Sara K Toich
(74) *Attorney, Agent, or Firm* — Hinckley Allen & Snyder; Stephen Holmes

(57) ABSTRACT

A system and method for determining therapeutic expiratory positive airway pressure (EPAP) dosage through constant monitoring of flow patterns, which can be used to determine the expiratory time constant, and upon determining the expiratory time constant comparing that we various EPAP dosages to determine an optimal therapeutic EPAP dosage.

17 Claims, 14 Drawing Sheets

(56) References Cited

U.S. PATENT DOCUMENTS

| | | | |
|---|---|---|---|
| 2014/0290657 A1 | 10/2014 | Vandine | |
| 2015/0059754 A1* | 3/2015 | Chbat | A61B 5/091 |
| | | | 128/204.23 |
| 2015/0230750 A1 | 8/2015 | McDarby | |
| 2016/0136370 A1 | 5/2016 | Heesch | |
| 2017/0007174 A1* | 1/2017 | Colbaugh | A61B 5/7278 |
| 2018/0289911 A1 | 10/2018 | Sharifi | |
| 2019/0125994 A1 | 5/2019 | Nihon | |
| 2019/0374733 A1* | 12/2019 | Vicario | A61M 16/024 |
| 2020/0206443 A1 | 7/2020 | Zhu | |
| 2021/0393902 A1* | 12/2021 | Dong | A61M 16/0003 |
| 2023/0107369 A1 | 4/2023 | Shouldice | |

OTHER PUBLICATIONS

Depta et al. "Time constant to determine PEEP levels in mechanically ventilated COVIDâ19 ARDS: a feasibility study" (Year: 2022).*

Brack, T., Jubran, A., & Tobin, M. J. (2002). Dyspnea and Decreased Variability of Breathing in Patients with Restrictive Lung Disease. American Journal of Respiratory and Critical Care Medicine, 165(9), 1260 1264. https://doi.org/10.1164/rccm.2201018.

Fernandes, M., Cukier, A., & Feltrim, M. I. Z. (2011). Efficacy of diaphragmatic breathing in patients with chronic obstructive pulmonary disease. Chronic Respiratory Disease, 8(4), 237 244. https://doi.org/10.1177/1479972311424296.

Fouzas, S., Theodorakopoulos, I., Delgado-Eckert, E., Latzin, P., & Frey, U. (2017). Breath-to-breath variability of exhaled CO2 as a marker of lung dysmaturity in infancy. Journal of Applied Physiology, 123(6), 1563 1570. https://doi.org/10.1152/japplphysiol.00372.2017.

Gutierrez, G., Das, A., Ballarino, G., Beyzaei-Arani, A., Türkan, H., Wulf-Gutierrez, M., Rider, K., Kaya, H., & Amdur, R. (2013). Decreased respiratory rate variability during mechanical ventilation is associated with increased mortality. Intensive Care Medicine, 39(8), 1359 1367. https://doi.org/10.1007/s00134-013-2937-5.

Kiss, T., Silva, P. L., Huhle, R., Moraes, L., Santos, R. S., Felix, N. S., Santos, C. L., Morales, M. M., Capelozzi, V. L., Kasper, M., Pelosi, P., Gama de Abreu, M., & Rocco, P. R. M. (2016). Comparison of different degrees of variability in tidal volume to prevent deterioration of respiratory system elastance in experimental acute lung inflammation. BJA: British Journal of Anaesthesia, 116(5), 708 715. https://doi.org/10.1093/bja/aew093.

Martinez, J. m., Kent, J. m., Coplan, J. d., Browne, S. t., Papp, L. a., Sullivan, G. m., Kleber, M., Perepletchikova, F., Fyer, A. j., Klein, D. f., & Gorman, J. m. (2001). Respiratory variability in panic disorder. Depression and Anxiety, 14(4), 232 237. https://doi.org/10.1002/da. 1072.

Pan, Y. N., Chen, J., & Li, X. L. (2009). Spectral entropy: A complementary index for rolling element bearing performance degradation assessment. Proceedings of the Institution of Mechanical Engineers, Part C: Journal of Mechanical Engineering Science, 223(5), 1223 1231. https://doi.org/10.1243/09544062JMES1224.

Sharma, V., & Parey, A. (2016). A Review of Gear Fault Diagnosis Using Various Condition Indicators. Procedia Engineering, 144, 253 263. https://doi.org/10.1016/j.proeng.2016.05.131.

Vakkuri, A., Yli-Hankala, A., Talja, P., Mustola, S., Tolvanen-Laakso, H., Sampson, T., & Viertiö-Oja, H. (2004). Time-frequency balanced spectral entropy as a measure of anesthetic drug effect in central nervous system during sevoflurane, propofol, and thiopental anesthesia. Acta Anaesthesiologica Scandinavica, 48(2), 145 153. https://doi.org/10.1111/j.0001-5172.2004.00323.x.

van den Bosch, O. F. C., Alvarez-Jimenez, R., de Grooth, H.-J., Girbes, A. R. J., & Loer, S. A. (2021). Breathing variability—Implications for anaesthesiology and intensive care. Critical Care, 25(1), 280. https://doi.org/10.1186/s13054-021-03716-0.

Anonymous: "Intelligent Ventilation since 1983 HAMILTON-GS/S1 Quick Guide", Jul. 20, 2018 (Jul. 20, 2018).

Platen Philip Von et al: "Automated Positive End-Expiratory Pressure Titration during Mechanical Ventilation", IFAC-PAPERSONLINE, vol. 54, No. 15, Nov. 2, 2021 (Nov. 2, 2021), pp. 412-417.

Branson Rd et al: "Closed Loop Mechanical Ventilation", Respiratory Care, Daedalus Enterprises, Inc, United States, vol. 47, Apr. 30, 2002 (Apr. 30, 2002), pp. 427-543.

* cited by examiner

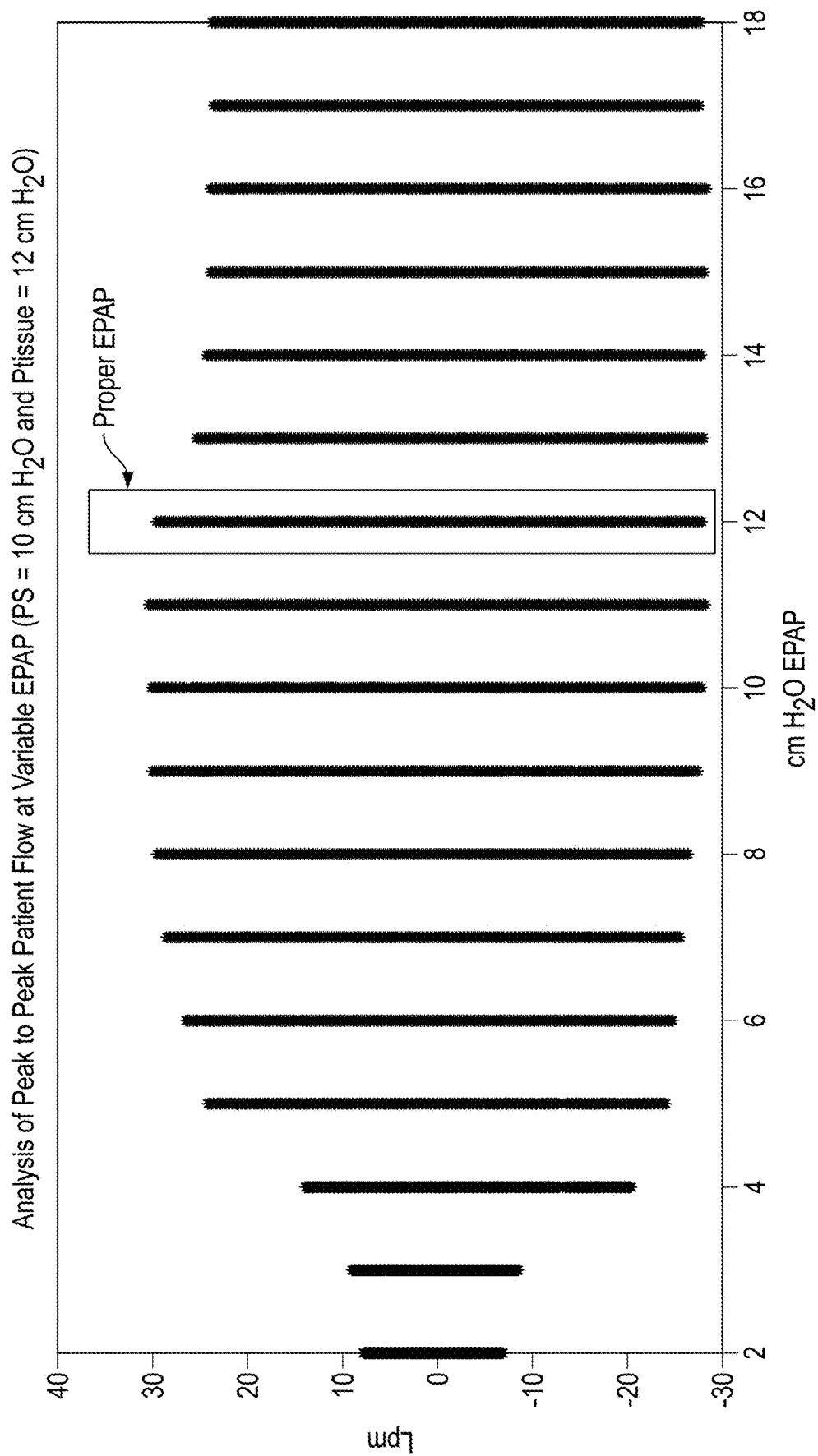

| EVENT: | ACTION: |
|---|---|
| Candidate EPAP Dosage has a pressure that is higher than the Baseline EPAP dosage, but there is <u>not a significant</u> improvement to the expiratory time constant | 1) Set Candidate EPAP dosage to a lower pressure |
| Candidate EPAP Dosage has a pressure that is higher than the Baseline EPAP dosage and there is a <u>significant</u> improvement to the expiratory time constant | 1) Set the Baseline EPAP dosage to the Candidate EPAP dosage pressure; and<br>2) Set the Candidate EPAP dosage to a higher pressure |
| Candidate EPAP Dosage has a pressure that is lower than the Baseline EPAP dosage and the expiratory time constant is <u>significantly worse</u> | 1) Set the Candidate EPAP dosage to a higher pressure |
| Candidate EPAP Dosage has a pressure that is lower than the Baseline EPAP dosage and the expiratory time constant is <u>not significantly worse</u> | 1) Set the Baseline EPAP dosage to the Candidate EPAP dosage pressure; and<br>2) Set the Candidate EPAP dosage to a lower pressure |

FIG. 6B

SYSTEMS AND METHODS OF DETERMINING THERAPEUTIC EXPIRATORY PRESSURE AUTOMATICALLY

COPYRIGHT INFORMATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to determining the therapeutic pressure for continuous positive airway pressure (CPAP) machines, and more particularly bi-level positive airway pressure (BiPAP) machines which provide pressure to maintain open airways for both inspiration and expiration for those diagnosed with Obstructive Sleep Apnea (OSA).

BACKGROUND OF THE INVENTION

Patients diagnosed with Obstructive sleep apnea (OSA) in combination with other diseases that cause respiratory insufficiency such as Obesity Hypoventilation Syndrome (OHS) or Chronic Obstructive Pulmonary Disease (COPD) may be prescribed bilevel pressure therapy. In patients suffering from OSA, the upper airway may collapse during sleep. These patients require positive pressure during expiration (EPAP) to provide airway stability and to facilitate expiration. Traditional methods of detecting airway collapse in OSA often use inspiratory flow limitation (IFL), inspiratory flow reduction (Hypopnea) or cessation of inspiratory flow (Apnea) to diagnose airway collapse. Unfortunately, in bilevel pressure therapy, the pressure during inspiration (IPAP) is often much higher than the EPAP and patients with obstructed airways during expiration will not be flow limited during the inspiratory pressure therapy and traditional methods used by many CPAP machines do not work in bilevel machines. Furthermore, the backup breath rate of a mechanical ventilator will prevent any extended apneic intervals. For these reasons, it is necessary to use other means to detect and treat airway collapse during the expiratory phase when bilevel therapy is used.

The present embodiments and description seek to address these stated problems and others that will become apparent to those skilled in the art.

SUMMARY OF THE INVENTION

The method and corresponding systems described herein use tracking of an estimation of the patient's expiratory time constant as the primary determinant for selecting a therapeutic EPAP dosage. The logical progression of EPAP control using the expiratory time constant is described in detail below. The pressure, flow and volume signals can be collected and processed by the ventilator in order to estimate the expiratory time constant. The methods and systems can use an algorithm within a processing unit of a ventilator to adjust the EPAP dosage according to a set of rules designed to stabilize the airway with the minimal pressure.

In one embodiment, a method of determining a therapeutic dosage of expiratory positive airway pressure (EPAP) comprising the steps of: automatically cataloging measurements of expiratory time constants and expiratory flow patterns, wherein each expiratory time constant is determined in part by a corresponding flow pattern, wherein each flow pattern is determined by analyzed breath data of an associated user, and wherein at least one set of the analyzed breath data is acquired during a first dosage of EPAP and at least one set is acquired during a second dosage of EPAP that differs in pressure from the first dosage; comparing at least one measured cataloged expiratory time constant and flow pattern to another measured cataloged expiratory time constant and flow pattern where each were acquired at different dosages of EPAP; determining a baseline therapeutic dosage of EPAP based on the lowest dosage of EPAP where increasing EPAP dosage above the baseline therapeutic dosage does not significantly reduce the expiratory time constant or result in an abnormally low peak expiratory flow. repeating the above steps to determine if the baseline therapeutic dosage of EPAP should be increased or decreased; and updating the pressure of the baseline therapeutic dosage of EPAP when an improvement in one direction is determined.

The baseline therapeutic dosage of EPAP of this above method can be updated after each breath taken by the user.

This method of determining a therapeutic dosage of EPAP can further comprise the step of comparing a current measured expiratory flow pattern to a previous expiratory flow pattern to determine if the time constant associated with the current measured expiratory flow pattern should be considered based in part on whether the current measured expiratory flow pattern is irregular in view of the previous expiratory flow pattern.

This method of determining a therapeutic dosage of EPAP can further comprise the step of determining if a received breath data is a false signal, and upon determining it is a false signal precluding that breath data from being part of the measurements being used to update the pressure of the baseline therapeutic dosage of EPAP.

This method of determining a therapeutic dosage of EPAP can further comprise the step of determining if there is an excessive leak in a circuit associated with an EPAP system used for administering the EPAP dosage, and precluding the breath data concurrent with excessive leak from measurements being used to update the pressure of the baseline therapeutic dosage of EPAP.

This method of determining a therapeutic dosage of EPAP can further comprise the step of adjusting the first dosage of EPAP to a second dosage of EPAP after one or more sets of analyzed breath data at the first dosage of EPAP have been acquired. The second dosage of EPAP can be determined by using one of the following methods: using a random generator, using a pre-determined incremental shift, using a gradient decent method, or a stochastic process run on a processor.

The step above can also include adjusting the second dosage of EPAP to a third dosage of EPAP after one or more sets of analyzed breath data at the second dosage of EPAP have been acquired. Similarly, the third dosage of EPAP can be determined by using one of the following methods: using a random generator, using a pre-determined incremental shift, using a gradient decent method, or a stochastic process run on a processor.

In yet another embodiment, a method of determining a therapeutic dosage of expiratory positive airway pressure (EPAP) comprising the steps of: delivering an initial EPAP dosage based on a user's profile, which includes at least one of: a starting prescribed dosage, historical dosage data, or a minimum dosage output of a ventilator; determining and cataloging an initial expiratory time constant or initial set of expiratory time constants by analyzing one or more breaths obtained during the initial EPAP dosage; modifying the initial EPAP dosage to a second EPAP dosage; determining and cataloging a second expiratory time constant or second set of expiratory time constants by analyzing one or more breaths obtained during the second EPAP dosage; comparing the initial and second expiratory time constants or initial set and second set of expiratory time constants to determine a baseline therapeutic dosage of EPAP based on the lowest dosage of EPAP where increasing EPAP dosage above the baseline therapeutic dosage does not significantly reduce the expiratory time constant or significantly increase peak expiratory flow; continually determining and cataloging additional expiratory time constants based on additional analyzed breaths; periodically introducing a candidate EPAP dosage, which is either an increase or decrease in pressure from the baseline therapeutic EPAP dosage, and determining a trend of the additional expiratory time constants based on comparing the additional expiratory time constants associated with the candidate EPAP dosage and those associated with the baseline therapeutic dosage; and updating the baseline therapeutic EPAP dosage when an improvement in one direction is determined based in part on the lowest dosage of EPAP where increasing EPAP dosage above the baseline therapeutic dosage does not significantly reduce the expiratory time constant.

The periodically increasing or decreasing the EPAP dosage step can be further based on one of: a pre-determined time threshold, a pre-determined number of measured breaths, and an indicator of a sleep cycle change.

The expiratory time constants can be determined by analyzing a flow pattern associated with each analyzed breath.

The pressure change of modifying the initial EPAP dosage to a second EPAP dosage can be based on a stochastic process run on a processor.

In yet another embodiment, a method of determining a therapeutic dosage of expiratory positive airway pressure (EPAP) comprising the steps of: delivering a baseline EPAP dosage to a user; analyzing breaths associated with the baseline EPAP dosage to determine and catalog an expiratory time constant or set of expiratory time constants associated with the baseline EPAP dosage; delivering a candidate EPAP dosage, which has a pressure different from the baseline EPAP dosage; analyzing breaths associated with the candidate EPAP dosage to determine and catalog an expiratory time constant or set of expiratory time constants associated with the candidate EPAP dosage; and comparing the expiratory time constants of the baseline EPAP dosage and candidate EPAP dosage to: determine a trend of the compared expiratory time constants, determine if the baseline EPAP dosage should be replaced by the candidate EPAP dosage, and update the baseline EPAP dosage to match the pressure of the candidate EPAP dosage based on the replacement determination.

In this method, the candidate EPAP dosage replaces the baseline EPAP dosage when the candidate EPAP dosage has a pressure that is higher than the baseline EPAP dosage and the change in expiratory time constant is significantly improved.

Alternatively, the candidate EPAP dosage replaces the baseline EPAP dosage when the candidate EPAP dosage has a pressure that is lower than the baseline EPAP dosage and the change in expiratory time constant is not significantly worse.

This other embodiment can further comprise the steps of: repeating each of the steps and extending a period between delivering the baseline dosage and the candidate dosage when the baseline EPAP dosage has previously been updated, wherein the period is based on one of: a pre-determined time threshold, a pre-determined number of measured breaths, and an indicator of a sleep cycle change.

Alternatively, this other embodiment can further comprise the step of updating the candidate EPAP dosage based on the determined trend of the compared expiratory time constants.

These and other embodiments will become apparent to those skilled in the art upon reviewing the rest of the application.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 2B-E illustrate analysis of various measurements at variable EPAP with BiLevel therapy

FIGS. 4A-B illustrate a schematic of EPAP trials of how a baseline therapeutic EPAP can be arrived at;

FIGS. 6A-B illustrates a flowchart of a methodology for determining a baseline therapeutic EPAP dosage and examples of Events and Actions taken to arrive at the baseline therapeutic EPAP dosage;

FIG. 7 illustrates a basic schematic of an EPAP system the methods described herein can be incorporated with.

DETAILED DESCRIPTION OF THE INVENTION

Some definitions that will be helpful for this application including the following:

Baseline is used as a determined amount against which something is being measured. For example, the baseline therapeutic EPAP dosage, is the therapeutic EPAP dosage starting point against which test or candidate EPAP dosages are compared.

Candidate, as noted, is used as a test amount for a trial to compare against the baseline. As an example, Candidate EPAP or the determined Candidate expiratory time constant can be compared to a baseline EPAP or expiratory time constant.

EPAP dosage is the expiratory positive airway pressure dosage that is used to help keep a user's airway open when exhaling, until the user inhales next. This allows for normal breathing during sleeping by preventing airways from closing during sleep.

Dosage simply refers to the amount, which is often measured in centimeters water or written cm $H_2O$.

The term significant used throughout this application, whether significantly reduce, significantly improved, significantly worse, or other variation is meant to convey a statistical or mathematical deviation away from a mean or expected mean. This statistical deviation generally means at least one standard deviation or more, whereas, something less than a standard deviation would NOT be considered significant. Using standard deviation is not always robust, therefore, other forms of deviation could be used such as median absolute deviation. In summary, those skilled in the art of statistics would appreciate when a value has a mathematical or statistical variation that is 'significant.'

Figure 1A:
FIGS. 1A-C illustrate the basic relationship between airway resistance and applied pressure from a CPAP device.
Figure 1A:
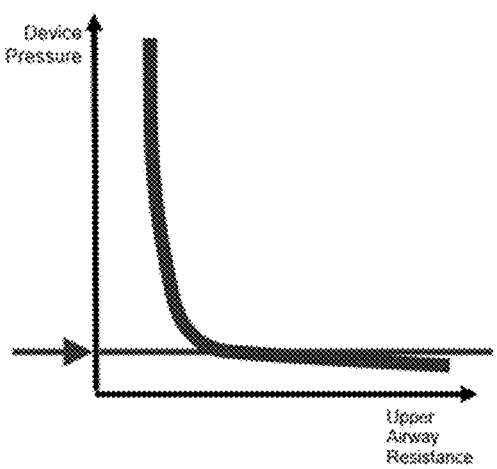
Figure 1B:
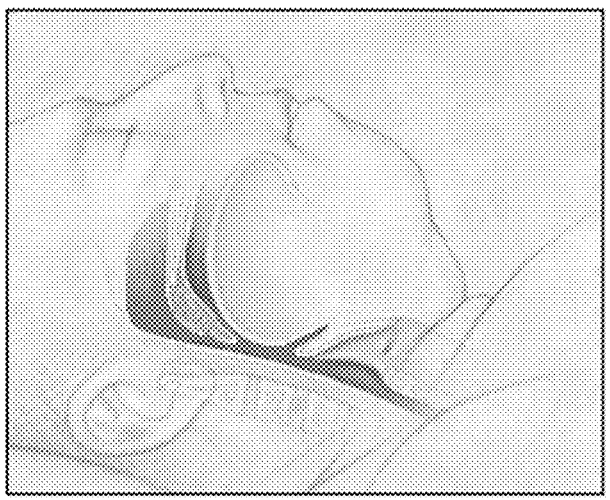
Figure 1B:
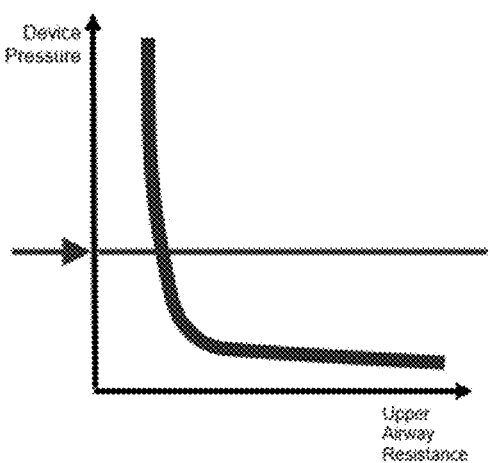
Figure 1C:
Figure 1C:
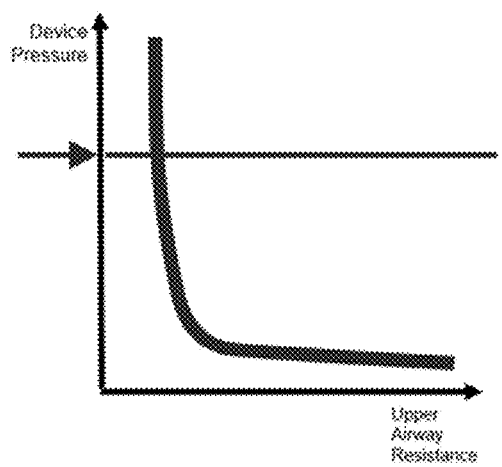

FIGS. 1A-C illustrate the basic relationship between airway resistance and applied pressure from a CPAP device. If the device does not apply sufficient pressure, the airway resistance increases to the point of total collapse (i.e., infinite airway upper airway resistance). This is illustrated in FIG. 1A. FIG. 1B illustrates the scenario where an optimal amount of pressure is provided, which opens the collapsed airway. In viewing FIG. 1C, one can see that applying additional pressure above the optimal pressure does not provide any additional benefit with regards to open the airway. Additional pressure can cause discomfort to the user, which in turn effects their sleep and eliminates the benefit of the therapy. Thus, it is important to optimize EPAP dosage therapy, so as to enable the user to sleep more normally, while not interrupting their sleep by introducing additional factors that mitigate this.

For example, in U.S. Pat. No. 9,775,558 an output signal is used to determine airway resistance for a user at a given time and can use that to adjust the EPAP dosage; however, the output signals used can create a vibratory or even low-humming sound each time the signal is generated, which in turn can interrupt the user's sleep. Attempts to mitigate this forced oscillation technique (FOT) can include trying to extend the timing between measurements from 30 seconds to several minutes, so as to not be incessant; however, the potential disturbance is still generated with each measurement. Thus, the effectiveness of the overall foal of these devices, which is to help user's sleep better, is reduced.

A better solution would include a way to automatically alter or update the EPAP dosage, so as to provide a more optimal solution, which enables the user to sleep better, and not introduce additional disturbances that would mitigate the benefits of controlled EPAP dosage. The present embodiments do both, while also improving upon the continuous controlling of EPAP dosage throughout a user's sleep, especially when they transition between sleep cycles.

One of the methods of accomplishing this is to determine the expiratory time constant, because it has been determined by the applicants that the physiology of the hypotonic airway changes relative to collapse and the applied pressure designed for relief. Thus, the relationship can be derived that the expiratory time constant which is the product of the resistance and the compliance of the respiratory system will also change.

The measurement of expiratory time constant is a reliable indication of the mechanics of the airway for both passive and spontaneously breathing patients. The expiration time constant is the product of the expiratory resistance and the compliance of the lung tissue and chest wall. Obstruction in the upper (OSA) or distal (COPD) airways will cause an increase in expiratory time constant. Changes in compliance due to ARDS or fibrosis will tend to decrease the expiratory time constant.

The measurement of the expiratory time constant is simple and can be done with accurate waveforms of the expiratory flow and the breath volume signal. The method described by Brunner, [Brunner, et al, *Simple method to measure the total expiratory time constant based on the passive expiratory flow-volume curve, Critical Care Medicine*, 1995 Vol 23. No 6] illustrates that the expiratory time constant is estimated during passive exhalation as:

$$RC_{exp} = \frac{-Vol}{\dot{V}} \quad [1]$$

where,

Vol is the instantaneous difference in volume from the start of inspiration, $\dot{V}$ is the flow (expiration designated as negative)

The equation above can be derived from the single compartment equation of motion for the respiratory system.

When using this method of estimating the expiratory time constant during Bilevel therapy, the assumption of passive respiratory muscles also applies to the applied pressure waveform. The equation above is only accurate when the applied pressure is unchanging. For this reason, when estimating the expiratory time constant, it is important to wait for the applied pressure to be at or near PEEP. Furthermore, as flow and volume approach zero (zero volume meaning FRC), the measurement becomes noisy, unreliable and inaccurate due to signal errors. As mechanics change with lung volume and non-linear elements are introduced into the respiratory system, so too, will the instantaneous estimation of expiratory time constant. For this reason, the expiratory time constant can more simply be described with a mean or median value during passive expiration.

Figure 2A:
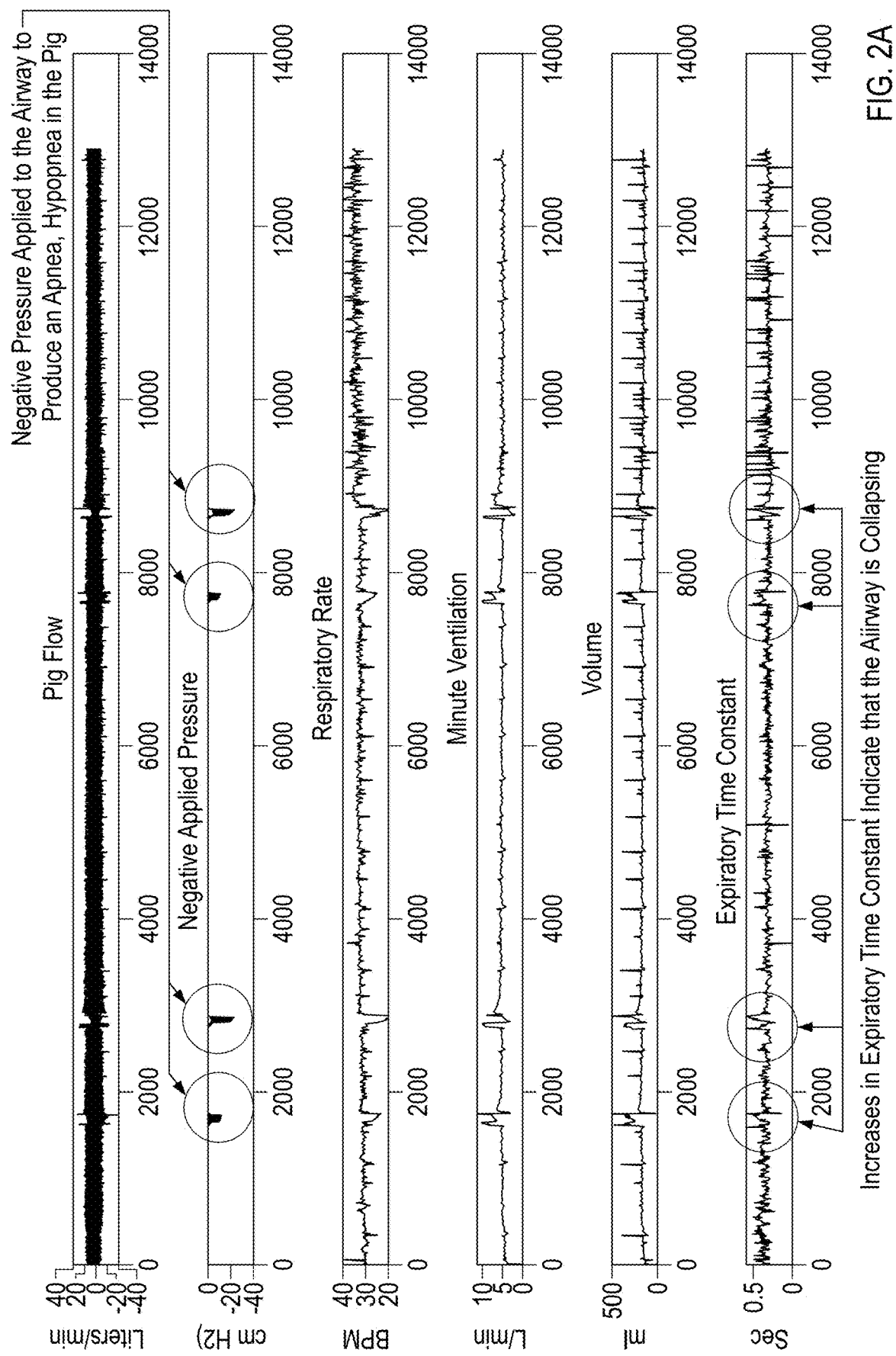
FIG. 2A illustrates a graph of introducing negative airway pressure to introduce airway collapse in a Pig to confirm a correlation with increase in expiratory time constant.
Figure 2C:
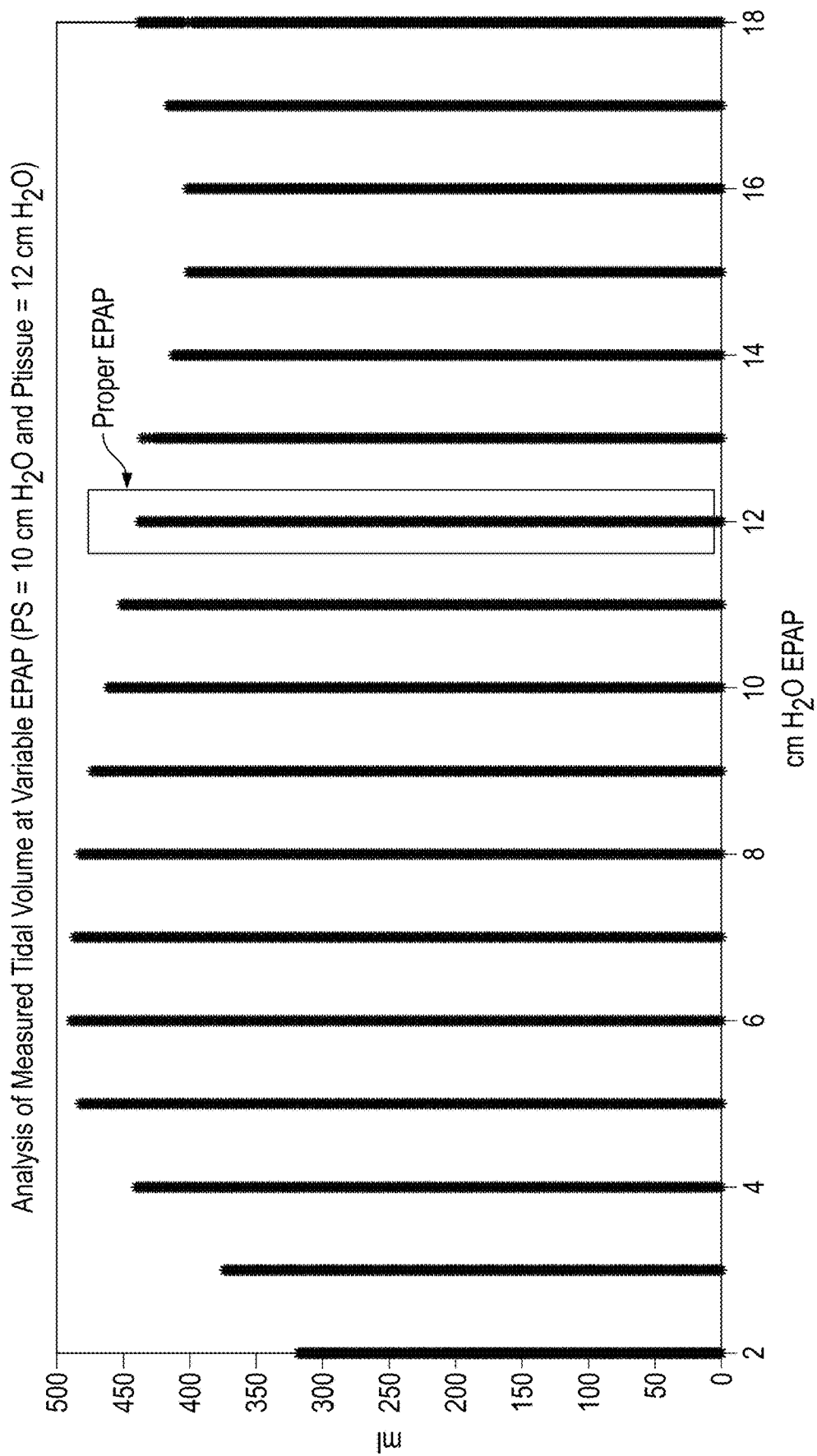

FIG. 2A illustrates a graph of introducing negative airway pressure to introduce a collapsing of the airway in a pig to confirm a correlation with increase in the expiratory time constant during each of the episodes of Apnea. These studies were done by the applicant on juvenile pigs with a design to induce airway collapse through negative pressure applied at the mouth. Each episode when the airway is suctioned closed with negative pressure corresponds to a sudden increase in the estimation of expiratory time constant, as shown in the graph.

FIGS. 2B-E illustrate analysis of other various measurements at variable EPAP, to illustrate why using the expiratory time constant is a better solution to determining a current baseline for therapeutic EPAP dosage. The data arrived at to generate the graphs in FIGS. 2B-E was obtained by using Starling resistor setup to approximate for upper and lower airway collapse during Bilevel pressure support. The starling resistor not only mimics the pressure vs. resistance relationship of the collapse of a hypotonic pathway, but the soft semi-elastic material stretched across the Starling chamber, collapses in a complex and chaotic way from the distal end to the proximal end that it is far more realistic than a single proportional opening controlled by a valve. Using the proportional valve setup was contemplated as test bench setup, but because it is far too predictable and provides less variance it was deemed inadequate to model for real life scenarios.

Upon examining data with fixed pressure support (variable volume and variable EPAP) the dynamic collapse of the simulated airway is able to produce realistic and variable expiratory flow waveforms. Thousands of simulations were analyzed and the results can be seen in FIGS. 2B-E. Looking first at FIG. 2B, it becomes readily apparent that when measuring peak-to-peak flow analysis that it isn't clear on how to arrive at a proper EPAP dosage. Similarly, when analyzing the measured tidal volume, as shown in FIG. 2C, again it is unclear on how to arrive at an appropriate EPAP dosage.

Figure 2D:
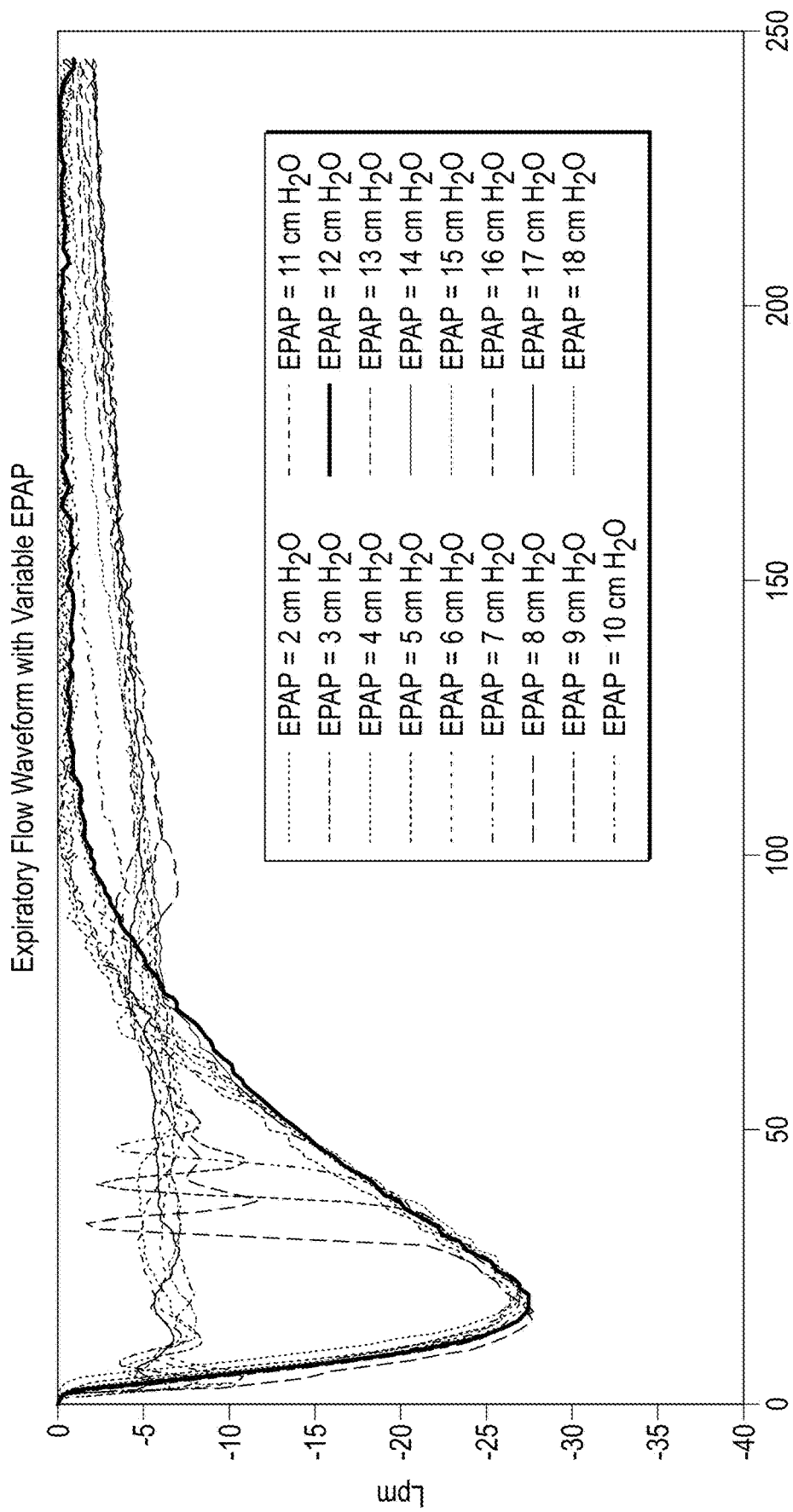

Now looking at FIG. 2D, when viewing the characteristic waveforms, it can be determined (shown) that at very low EPAP, the airway is obstructed for the entire expiratory phase (at all volumes). When the applied EPAP pressure is from 7 to 12 cm $H_2O$, the airway is flow limited only at lower volumes. When the applied EPAP pressure is 12 cm $H_2O$ and higher, the airway is conductive throughout the entire expiratory phase.

Figure 2E:
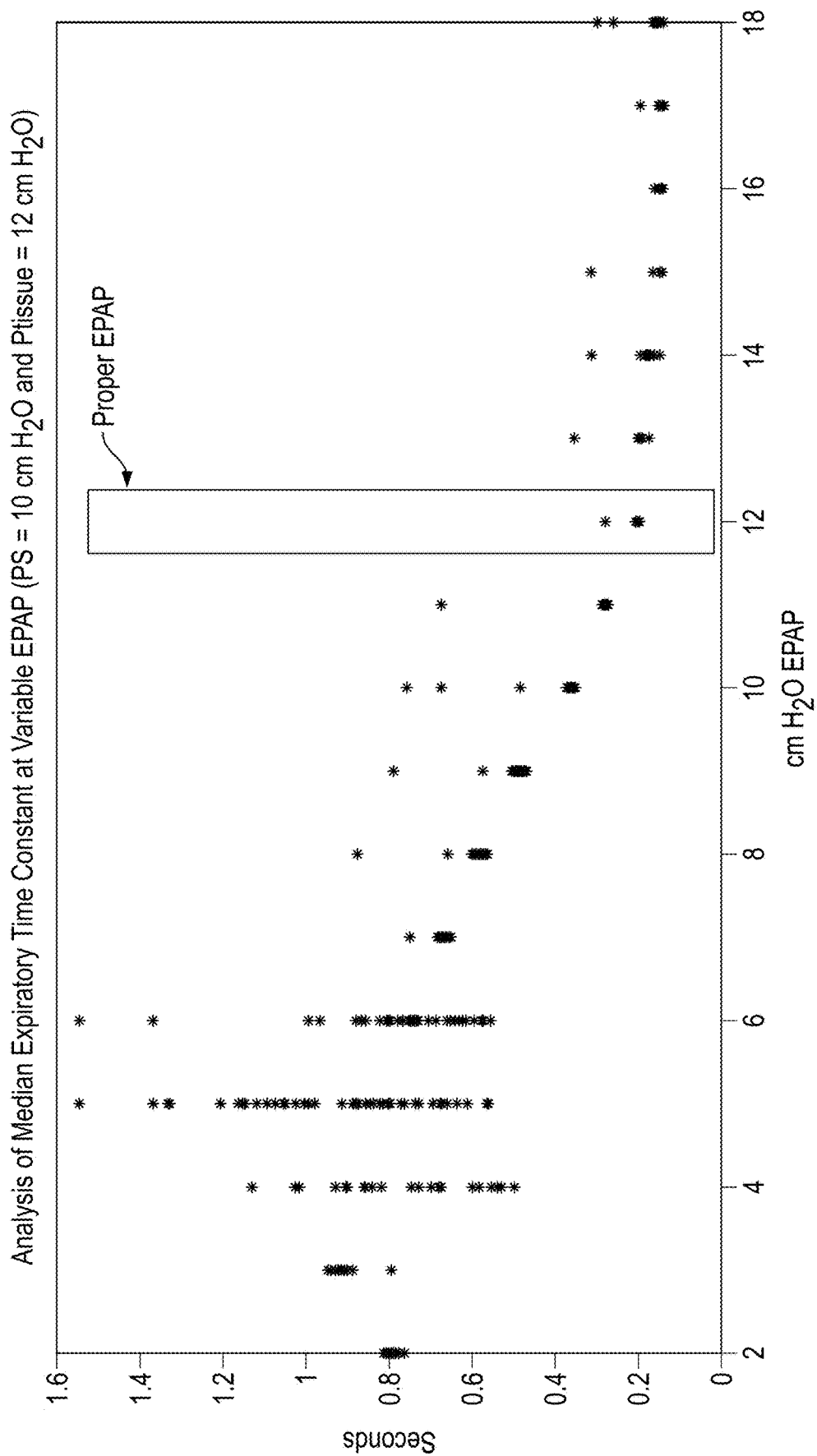

FIG. 2E illustrates the analysis of the median expiratory time constant measured on a large number of these breaths at various EPAP. Here one can see a knee at the proper EPAP and further validates in conjunction with the waveform graph of FIG. 2D that the potential to produce a proper therapeutic EPAP dosage using the median expiratory time constant. This can be done without additional disturbances to the user as noted above.

Additional details of the above studies and analysis can be obtained from the applicant, but the cited figures are sufficient to convey the concept of utilizing the expiratory time constant as part of a method to produce a more proactive and therapeutically beneficial EPAP dosage for users, while eliminating or rather by not introducing additional processes that could disturb the user from securing an optimal amount of sleep.

Figure 3:
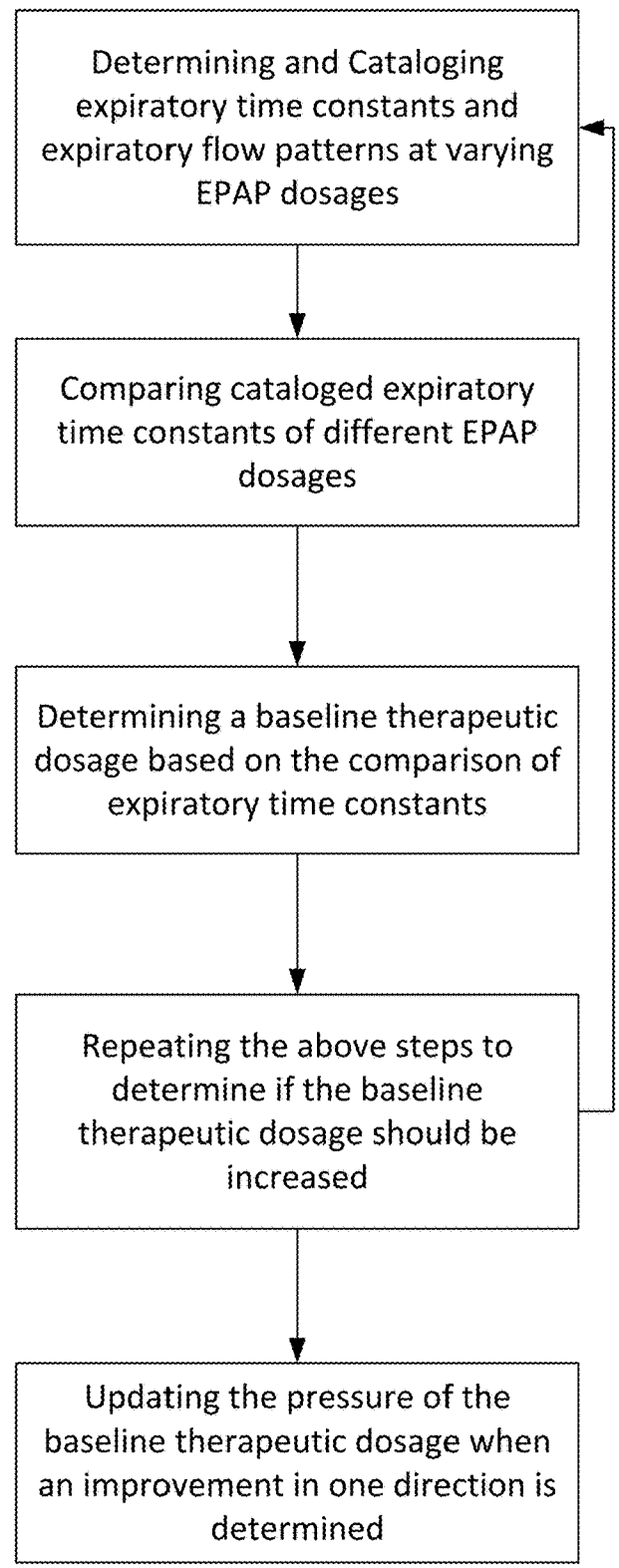
FIG. 3 illustrates a flowchart of a methodology for determining a baseline therapeutic EPAP dosage.

FIG. 3 illustrates a flowchart of a methodology for determining a baseline therapeutic EPAP dosage. In the method shown, one of the first steps includes: cataloging measurements of expiratory time constants and expiratory flow patterns at varying EPAP dosages. As noted above, by obtaining waveforms of the expiratory flow patterns and the breath volume signal from the analyzed breaths, the expiratory time constant can be determined using the above equation [1]. Cataloging can include recording the measurement in memory and associating it with a given EPAP dosage pressure at a particular time. If time is not recorded, then it can also include an order of when each measurement was received. As noted, the expiratory time constant can be determined in part from a deriving a flow pattern associated with the analyzed breath of the user, such as those shown in FIG. 2D.

It is helpful to use a number of determined expiratory time constants at a first EPAP pressure, such as a set window size for these data points, when comparing to a set of (the same window size of) expiratory time constants of a second EPAP pressure, to ensure that a clear indication of trend, upwards or downwards, can be determined. For this reason, averaging each of the validated expiratory time constants across a particular window size is advantageous. Of course, the system and method can compare single data points, but the preference is for an average of expiratory time constants at varying pressures to be used.

In the flow chart of FIG. 3 a comparison is performed between two different dosages of EPAP or rather the expiratory time constants associated with two different dosages; however, it should be readily understood that more than two dosages can be used and compared against to help arrive at a baseline therapeutic EPAP dosage therapy. The baseline therapeutic dosage of EPAP can be based on the lowest dosage of EPAP where increasing EPAP dosage above the baseline therapeutic dosage does not significantly reduce the expiratory time constant or result in an abnormally low peak expiratory flow.

Once this is done, the steps can be repeated to determine if the baseline therapeutic dosage of EPAP should be increased or decreased. If it should, then the baseline therapeutic dosage of EPAP can be updated and in the direction, up or down, when an improvement in one direction is determined.

Figure 4A:
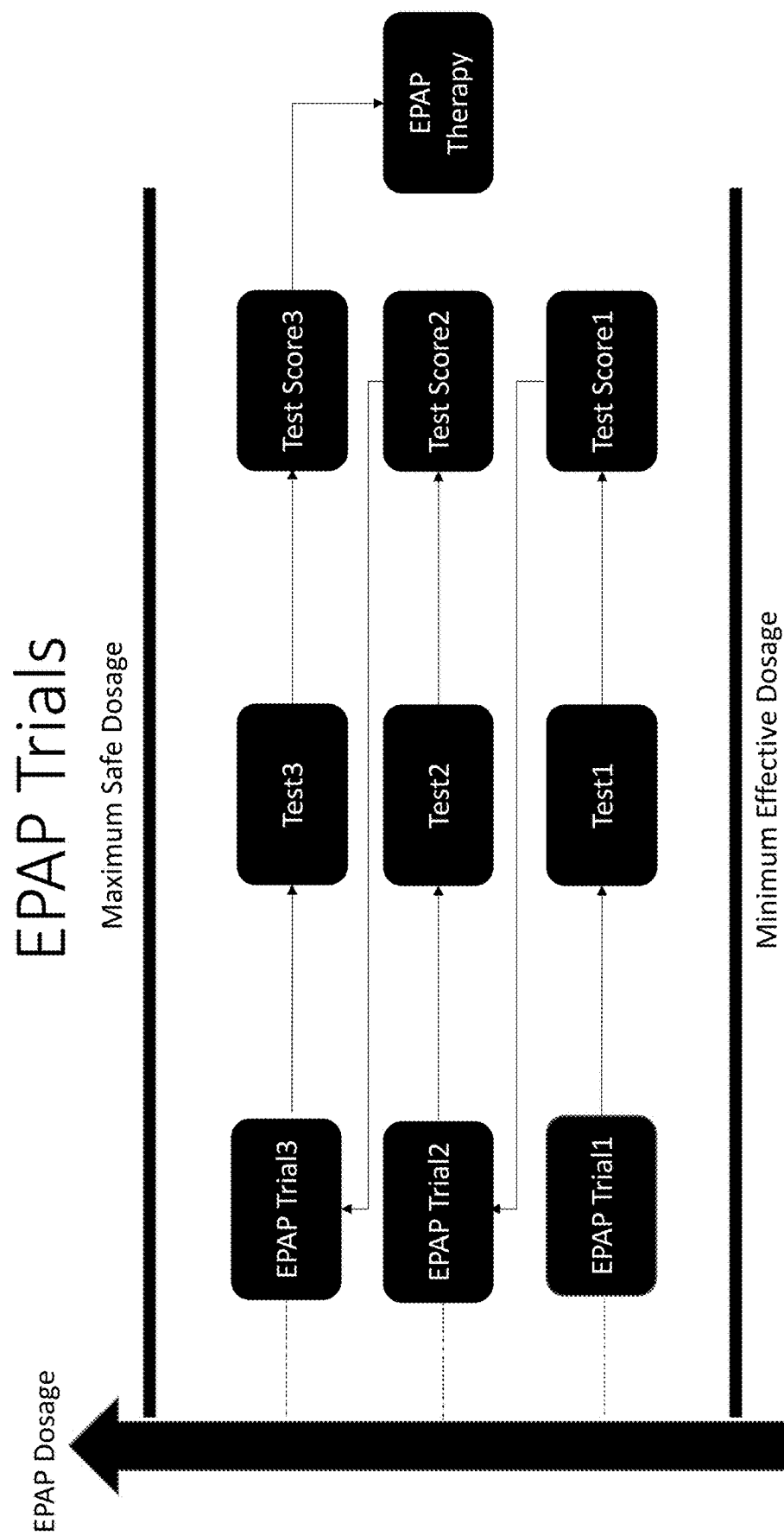
Figure 4B:
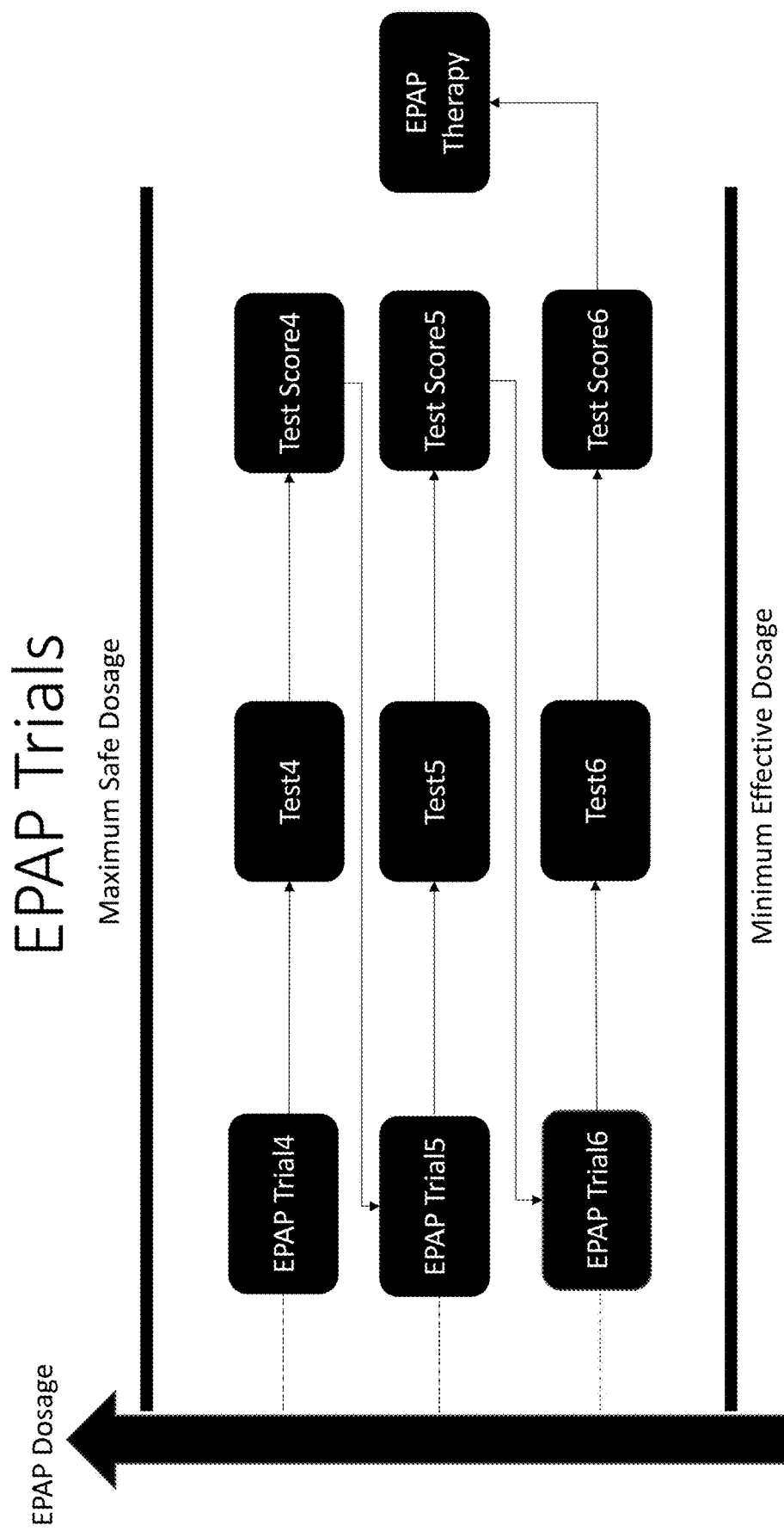

FIGS. 4A-B illustrate a schematic of EPAP trials of how a baseline therapeutic EPAP can be arrived at. Looking at FIG. 4A, to the left of the schematic illustrates the EPAP dosage, or increase in pressure from bottom to top. With most ventilators and PAP devices, there is a minimum effective dosage or pressure that the machine will operate at, as anything less than that pressure threshold doesn't have an effect or significant effect on the user. On the upper end, there also exists a maximum safe dosage, which is the highest dosage for any machine, so as to not harm the user. An initial candidate EPAP dosage (EPAP TRIAL1) is selected, which is closer to the minimum line. A first test, TEST1, is performed, or in other words the EPAP dosage is set to this EPAP TRIAL1 level and breaths from the user are analyzed and cataloged as the baseline therapy. A new TEST2 is performed at the higher TRIAL2 level and compared against the baseline, which is currently TRIAL1, to generate TEST SCORE2. Here it is determined that a significant improvement to the expiratory time constant was made, so the baseline changes to the TRIAL2 level and the baseline score is set to TEST SCORE 2. The next candidate EPAP dosage is one that is trending higher, such as at the TRIAL3 level. The TRIAL3 level dosage is set and another TEST3 is performed where a TEST SCORE3 is compared to the baseline, which is now at TRIAL2 level. Here the results do NOT indicate a significant improvement, thus the baseline stays at the TRIAL2 level and does not move. The trend for the next test would be to trend downward.

It should be noted that a pre-determined number of breaths or time period can be implemented in between testing a new dosage level. It should also be noted that once the system has arrived at a baseline EPAP therapy that has not improved from the previous test therapy, that an extended number of breaths or time period can be employed prior to the next candidate EPAP dosage test.

FIG. 4B illustrates the scenario where EPAP dosage is at a higher level and how the methodology works to arrive at the new baseline EPAP therapy. Here the TRIAL5 level is at a therapy that is lower than the current baseline therapy, EPAP Trial4 for which TEST SCORE 4 has been measured and cataloged. Just like above, the EPAP dosage is changed to the TRIAL5 level and a TEST5 is performed where breaths are again analyzed from the user and TEST SCORE5 is generated. This TEST SCORE5 is indicative that the TRIAL 5 dosage is not significantly worse from the baseline, TRIAL 4, so the action would be to change the baseline to the TRIAL5 level dosage and trend the new test lower. After a pre-determined period, a new TRIAL6 level dosage is set for a TEST6 that generates TEST SCORE6, which indicates the TRIAL6 level dosage is significantly worse than the baseline, TEST SCORE5, so the baseline remains at the current level and the trend reverses from going down to going upward. Since the previous test was not an improvement, the next trial or candidate dosage and test is implemented after a longer number of breaths or time period has passed.

It should be understood, that when an expiratory time constant is reduced to the extent that it is significant it is seen as a significant improvement. Thus, in the scenario where increasing pressure reduces the expiratory time constant that is deemed a significant improvement or reduction. Referring back to FIGS. 1A-C, there does become a dosage level where additional pressure has no additional impact on the reduction of the expiratory time constant, so when a candidate level is tested and the expiratory time is NOT significantly worse, this is an indicator that lower pressure is acceptable.

Figure 5:
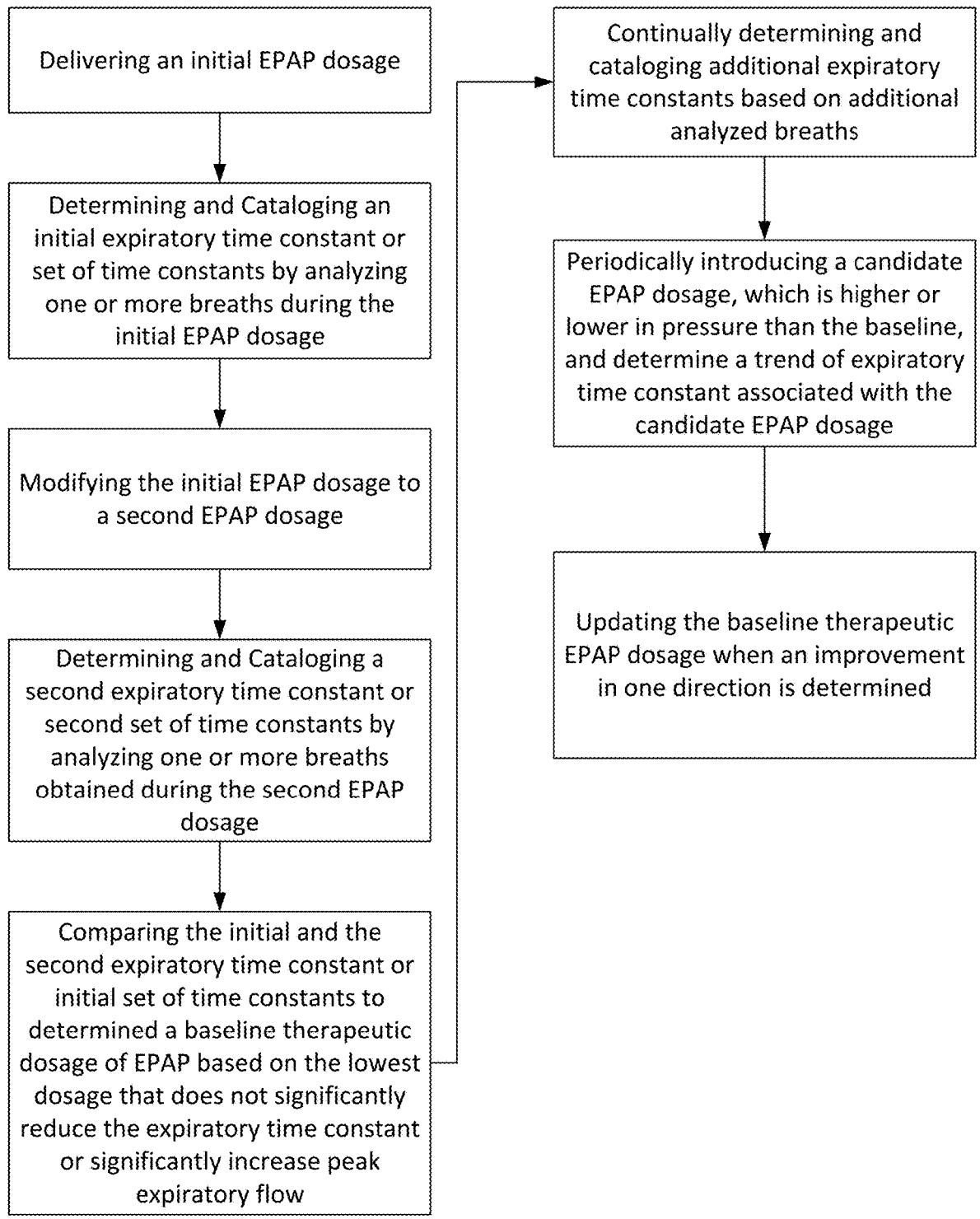
FIG. 5 illustrates a flowchart of another methodology for determining a baseline therapeutic EPAP dosage.

FIG. 5 illustrates a flowchart of another methodology for determining a baseline therapeutic EPAP dosage. Here an initial EPAP dosage is provided. Expiratory time constants are determined and cataloged at this initial EPAP dosage level. Then the initial dosage is modified to a second EPAP dosage, which could be higher or lower than the initial EPAP dosage, depending on where the initial EPAP dosage was set. An analysis of breaths at this second dosage level determines the expiratory constant, set of expiratory time constants, and/or average of expiratory time constants. These are then compared to those determined and cataloged from the initial EPAP dosage. The system and method can continue to determine and catalog expiratory time constants into memory. The system and method can be configured to periodically introduce a candidate dosage, which is used to determine the trend of the expiratory time constant, set of expiratory time constants, and/or average expiratory time constants for a given window size. If an improvement in one direction is determined than the baseline EPAP therapy dosage is changed to the candidate EPAP dosage.

It should be noted that improvement in one direction or other can mean, a reduction in expiratory time constant if the pressure was increased or it can mean the expiratory time constant did NOT get significantly worse if the pressure was decreased relative to the baseline EPAP therapy dosage.

Figure 6A:
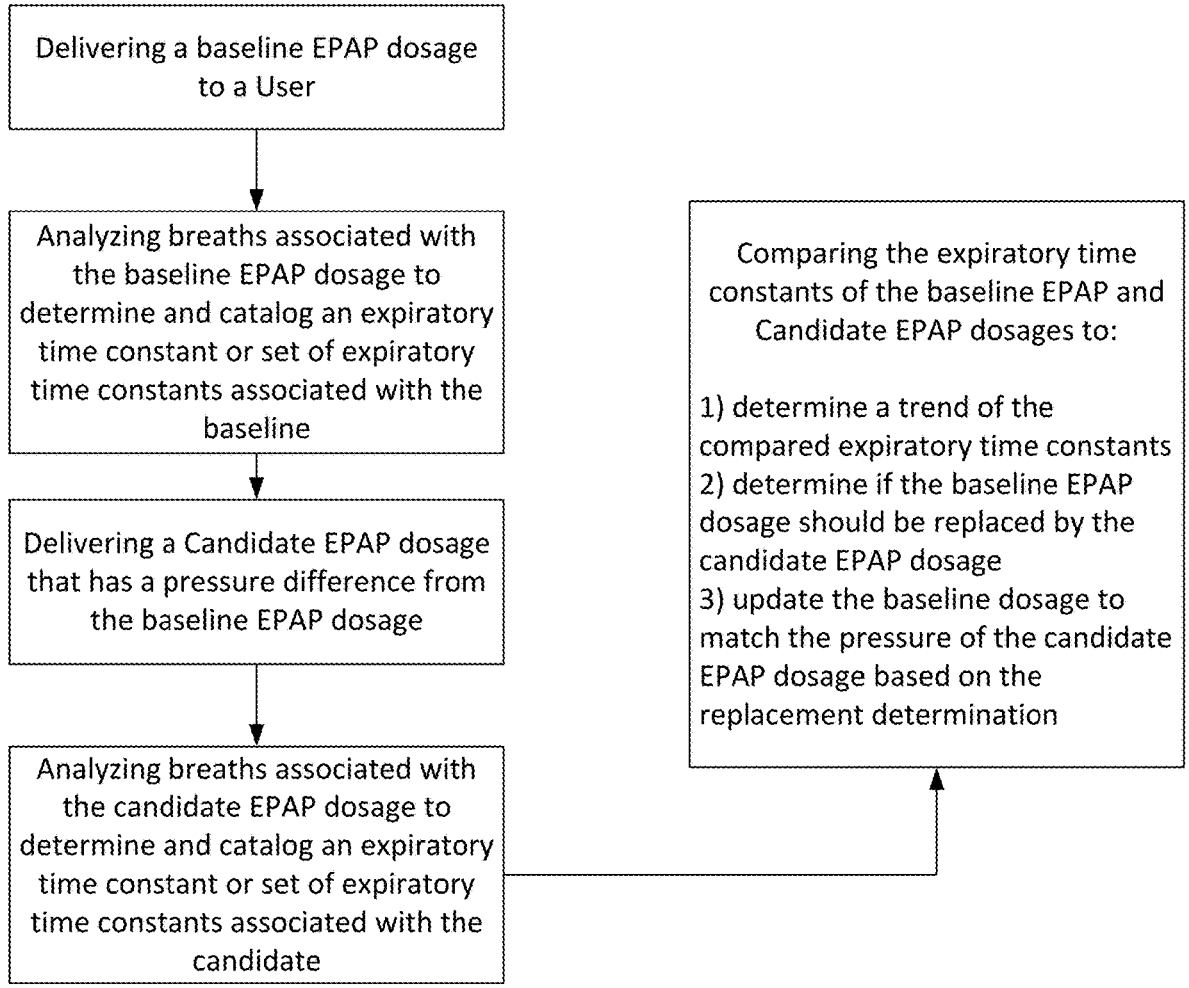

FIGS. 6A-B illustrates a flowchart of a methodology for determining a baseline therapeutic EPAP dosage and examples of Events and Actions taken to arrive at the baseline therapeutic EPAP dosage. In FIG. 6A, similar to the other methods, baseline EPAP dosage is delivered to the user. Breaths are analyzed at this therapeutic EPAP dosage level and cataloged or stored in memory. A candidate EPAP dosage, which is different than the baseline EPAP dosage. Breaths from the user are analyzed at this candidate EPAP dosage to determine the expiratory time constant, set of expiratory time constants, and/or average expiratory time constant. These two sets of expiratory time constant data can now be compared to 1) determine a trend of the expiratory time constant(s), 2) determine if the baseline should be replaced by the candidate EPAP dosage and 3) update or replace the baseline EPAP dosage to match that of the candidate EPAP dosage based on the determination.

FIG. 6B illustrates various events that occur and actions to be made, such as to the controller of the ventilator, based on the determinations arrived at from analyzed breath data that is cataloged and stored for comparison.

Figure 7:
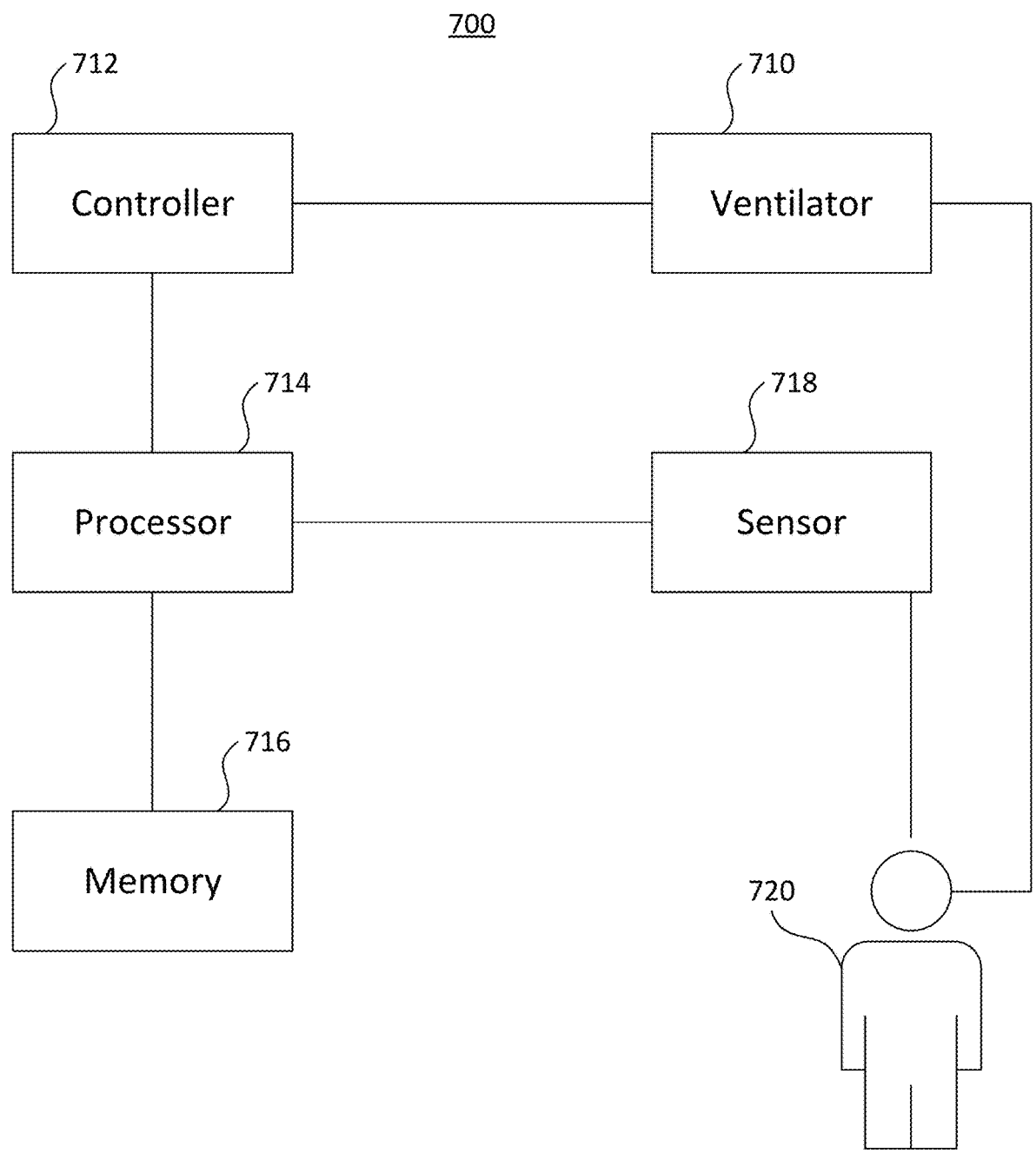

FIG. 7 illustrates a basic schematic of an EPAP system 700 the methods described herein can be incorporated with. The system 700 includes a ventilator 710, which is configured to provide positive air pressure to a user 720 during inhaling and exhaling. Generally, the pressure during exhaling is at a pressure lower to help the user breathe out comfortably, while providing a higher-pressure during inhalation. The ventilator has a controller 712 that is configured to modify the pressure for EPAP. The controller receives input on whether to change the baseline EPAP therapy dosage from the processor 714. The processor 714 is configured to receive and analyze data from the sensors 718 that detect flow and volume rates from a user's 720 breath. This analyzed data can be stored in memory 716 and also compared against other analyzed data in memory. The processor can run on a protocol, such as those described above, to automatically determine when to adjust the baseline therapy EPAP dosage. It is advantageous to have this system and method automated, so as to better match the EPAP dosage for a given user throughout their sleep cycle and reduce disturbances to the sleeping user. Anything less than automated, would not accomplish the objectives sought for in this application.

As noted above, by focusing on the expiratory time constant, the systems and methods described herein are more accurate at determining optimal EPAP dosage pressure, which also makes the computational requirements performed by a processor more efficient as it eliminates unnecessary and possibly confusing data that would otherwise make any attempt at optimization extremely difficult if not impossible, or not consistent.

It should be noted that there are various methods, including several devices running various algorithms to determine the current phase of a sleep cycle a user is currently in. Some of these include using devices and methods include a using polysomnography (PSG), various wearable devices, such as smartwatches that monitor heart rates, and movements, smart beds or pads that also monitor heart rates, movements and even audio sensors to determine a user's sleep cycle. The PSG method is still generally perceived to be the most accurate as it directly takes data acquired from sensors monitoring the optical nerve. However, any of the above devices and methods, as well as similar methods and devices can be used to determine the phase of a sleep cycle a user is in. This input can be used by the system and methods herein to help determine in part when to increase or decrease the EPAP dosage, which is tested and used to update or confirm the baseline EPAP dosage.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A method of determining a therapeutic dosage of expiratory positive airway pressure (EPAP) comprising the steps of:
   automatically cataloging measurements of expiratory time constants and corresponding expiratory flow patterns, wherein each expiratory time constant is determined in part by its corresponding expiratory flow pattern, wherein each expiratory flow pattern is determined by analyzed breath data of an associated user, and wherein at least one set of the analyzed breath data is acquired during a first dosage of EPAP and at least one set is acquired during a second dosage of EPAP that differs in pressure from the first dosage;
   comparing at least one measured cataloged expiratory time constant with its corresponding expiratory flow pattern to another measured cataloged expiratory time constant with its corresponding expiratory flow pattern where each were acquired at different dosages of EPAP;
   determining a baseline therapeutic dosage of EPAP which is the lowest dosage of EPAP such that increasing the baseline EPAP dosage does not significantly reduce the expiratory time constant or result in significantly low peak expiratory flow;

repeating the above steps with at least one increased or decreased dosage of EPAP to determine if the baseline therapeutic dosage of EPAP should be increased or decreased; and updating the pressure of the baseline therapeutic dosage of EPAP to the increased or decreased dosage when an improvement of the expiratory time constant is determined.

2. The method of determining a therapeutic dosage of expiratory positive airway pressure (EPAP) of claim 1, wherein the baseline therapeutic dosage of EPAP can be updated after each breath taken by the user.

3. The method of determining a therapeutic dosage of expiratory positive airway pressure (EPAP) of claim 1, further comprising the step of comparing a current measured expiratory flow pattern to a previous expiratory flow pattern to determine if the time constant associated with the current measured expiratory flow pattern is irregular in view of the previous expiratory flow pattern.

4. The method of determining a therapeutic dosage of expiratory positive airway pressure (EPAP) of claim 1, further comprising the step of determining if a received breath data is a false signal, and upon determining it is a false signal precluding that breath data from being part of the measurements being used to update the pressure of the baseline therapeutic dosage of EPAP.

5. The method of determining a therapeutic dosage of expiratory positive airway pressure (EPAP) of claim 1, further comprising the step of determining if there is an excessive leak in a circuit associated with an EPAP system used for administering the EPAP dosage, and precluding the breath data concurrent with excessive leak from measurements being used to update the pressure of the baseline therapeutic dosage of EPAP.

6. The method of determining a therapeutic dosage of expiratory positive airway pressure (EPAP) of claim 1, wherein the updated dosage of EPAP is determined by using one of the following methods: using a random generator, using a pre-determined incremental shift, using a gradient decent method, or a stochastic process run on a processor.

7. The method of determining a therapeutic dosage of expiratory positive airway pressure (EPAP) of claim 1, further comprising the steps of continuously repeating the steps of claim 1 to continuously update the pressure of the baseline therapeutic dosage of EPAP.

8. The method of determining a therapeutic dosage of expiratory positive airway pressure (EPAP) of claim 7, wherein the continuously updated dosage of EPAP is determined by using one of the following methods: using a random generator, using a pre-determined incremental shift, using a gradient decent method, or a stochastic process run on a processor.

9. A method of determining a therapeutic dosage of expiratory positive airway pressure (EPAP) comprising the steps of:

delivering an initial EPAP dosage based on a user's profile, which includes at least one of: a starting pre-scribed dosage, historical dosage data, or a minimum dosage output of a ventilator;

determining and cataloging an initial expiratory time constant or initial set of expiratory time constants by analyzing one or more breaths obtained during the initial EPAP dosage;

modifying the initial EPAP dosage to a second EPAP dosage;

determining and cataloging a second expiratory time constant or second set of expiratory time constants by analyzing one or more breaths obtained during the second EPAP dosage;

comparing the initial and second expiratory time constants or initial set and second set of expiratory time constants to determine a baseline therapeutic dosage of EPAP based on the lowest dosage of EPAP such that increasing the baseline EPAP dosage does not significantly reduce the expiratory time constant or significantly increase peak expiratory flow;

continually determining and cataloging additional expiratory time constants based on additional analyzed breaths;

periodically introducing a candidate EPAP dosage, which is either an increase or decrease in pressure from the baseline therapeutic EPAP dosage, and determining a trend of the additional expiratory time constants based on comparing the additional expiratory time constants associated with the candidate EPAP dosage and those expiratory time constants associated with the baseline therapeutic dosage; and updating the pressure of the baseline therapeutic EPAP dosage to the candidate EPAP dosage when an improvement of the expiratory time constant is determined.

10. The method of determining a therapeutic dosage of expiratory positive airway pressure (EPAP) of claim 9, wherein the step of periodically introducing a candidate EPAP dosage is further based on one of: a pre-determined time threshold, a pre-determined number of measured breaths, and an indicator of a sleep cycle change.

11. The method of determining a therapeutic dosage of expiratory positive airway pressure (EPAP) of claim 9, wherein the expiratory time constants are determined by analyzing a flow pattern associated with each analyzed breath.

12. The method of determining a therapeutic dosage of expiratory positive airway pressure (EPAP) of claim 9, wherein the step of modifying the initial EPAP dosage to the second EPAP dosage is based on a stochastic process run on a processor.

13. A method of determining a therapeutic dosage of expiratory positive airway pressure (EPAP) comprising the steps of:

delivering a baseline EPAP dosage to a user;

analyzing breaths associated with the baseline EPAP dosage to determine and catalog an expiratory time constant or set of expiratory time constants associated with the baseline EPAP dosage;

delivering a candidate EPAP dosage, which has a pressure different from the baseline EPAP dosage;

analyzing breaths associated with the candidate EPAP dosage to determine and catalog an expiratory time constant or set of expiratory time constants associated with the candidate EPAP dosage; and comparing the expiratory time constants of the baseline EPAP dosage and candidate EPAP dosage to:
1) determine a trend of the compared expiratory time constants,
2) determine if the baseline EPAP dosage should be replaced by the candidate EPAP dosage, and 3) update the baseline EPAP dosage to the candidate EPAP dosage based on the determination of step 2 if the baseline EPAP dosage should be replaced by the candidate EPAP dosage.

14. The method of determining a therapeutic dosage of expiratory positive airway pressure (EPAP) of claim 13, wherein the candidate EPAP dosage replaces the baseline EPAP dosage when the candidate EPAP dosage has a pressure that is higher than the baseline EPAP dosage and the expiratory time constant is significantly lowered.

15. The method of determining a therapeutic dosage of expiratory positive airway pressure (EPAP) of claim 13, wherein the candidate EPAP dosage replaces the baseline EPAP dosage when the candidate EPAP dosage has a pressure that is lower than the baseline EPAP dosage and the change in expiratory time constant is not significantly increased.

16. The method of determining a therapeutic dosage of expiratory positive airway pressure (EPAP) of claim 13, further comprising the steps of:

repeating each of the steps of claim 13 wherein the period between delivering the baseline dosage and the candidate dosage when the baseline EPAP dosage has previously been updated is extended, and wherein the period is based on one of: a pre-determined time threshold, a pre-determined number of measured breaths, and an indicator of a sleep cycle change.

17. The method of determining a therapeutic dosage of expiratory positive airway pressure (EPAP) of claim 13, further comprising the step of updating the candidate EPAP dosage based on the determined trend of the compared expiratory time constants.

* * * * *